W. H. COWDERY.
AGRICULTURAL IMPLEMENT.
APPLICATION FILED JUNE 6, 1914.
1,110,673.
Patented Sept. 15, 1914.
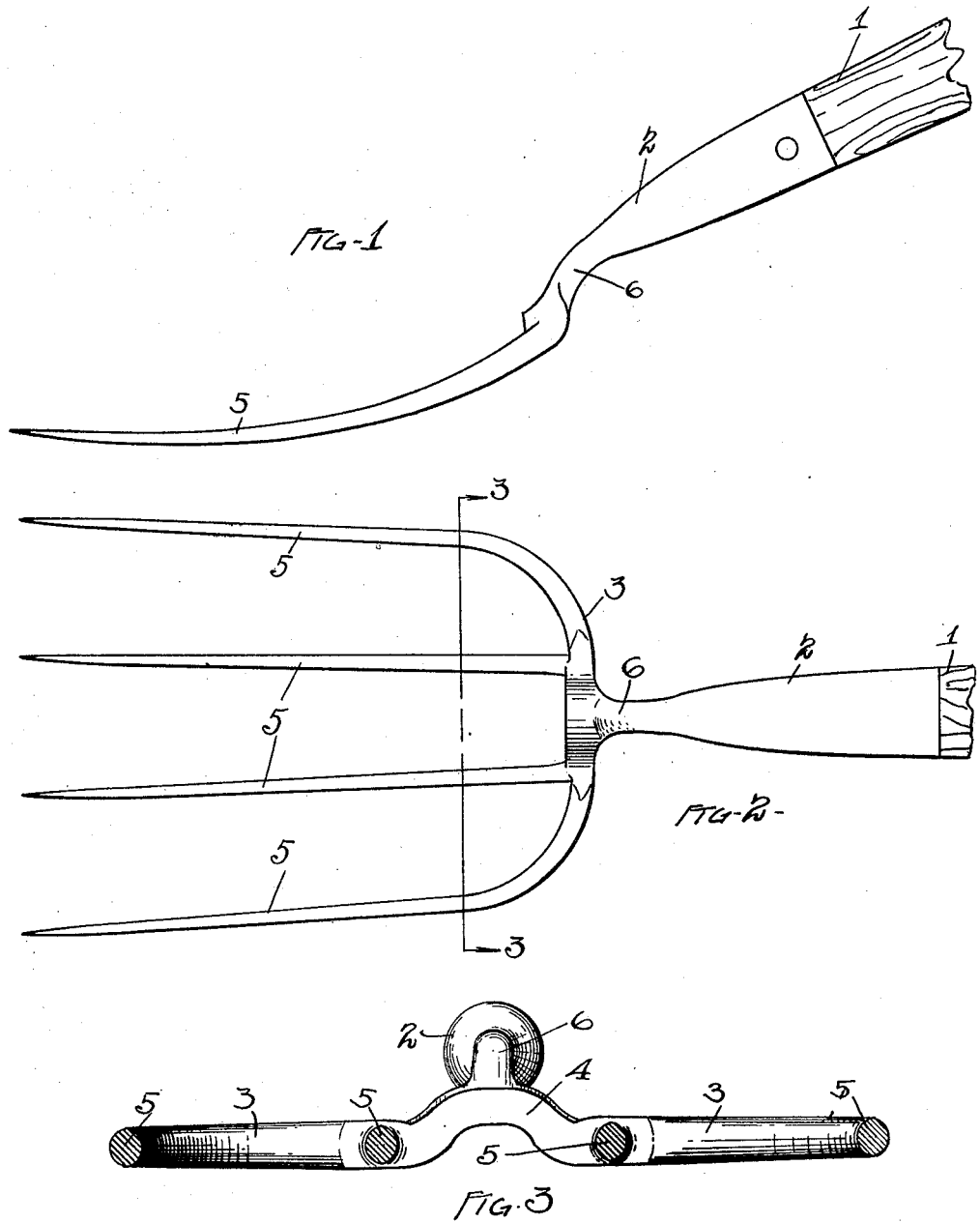
WITNESSES=
O. M. Kappler
H. B. Fay
INVENTOR
Warren H. Cowdery
BY Fay & Oberlin
ATTORNEYS

UNITED STATES PATENT OFFICE.

WARREN H. COWDERY, OF CLEVELAND, OHIO, ASSIGNOR TO THE AMERICAN FORK AND HOE COMPANY, OF CLEVELAND, OHIO, A CORPORATION OF OHIO.

AGRICULTURAL IMPLEMENT.

1,110,673.  Specification of Letters Patent.  Patented Sept. 15, 1914.

Application filed June 6, 1914. Serial No. 843,435.

*To all whom it may concern:*

Be it known that I, WARREN H. COWDERY, a citizen of the United States, and a resident of Cleveland, county of Cuyahoga, and State of Ohio, have invented a new and useful Improvement in Agricultural Implements, of which the following is a specification, the principle of the invention being herein explained and the best mode in which I have contemplated applying that principle, so as to distinguish it from other inventions.

The present invention relates to a manure fork which has been designed in order to utilize shorter handles than are at present used in this type of forks, and handles which cannot be used with satisfactory results in the present type. In order to manufacture a satisfactory manure fork it is necessary that the tines be placed in a certain relation and at a certain angle to the plane of the handle, and in order to secure this relation it has been customary to form the handle with a certain degree of curvature which will render the fork convenient to manipulate. In order to secure this desired amount of curvature in the handles, the handles must be of certain length in order to allow for the loss in length caused by the necessary bending, and a large number of handles are at present rendered useless because they are a few inches too short.

The present invention has been designed to provide a fork proper, which will permit of the use of these short handles and at the same time to so dispose the tines with respect to the plane of the handle that substantially the same convenience of manipulation may be had as in the former types.

To the accomplishment of the foregoing and related ends, said invention, then, consists of the means hereinafter fully described and particularly pointed out in the claims.

The annexed drawing and the following description set forth in detail certain mechanism embodying the invention. such disclosed means constituting, however, but one of various mechanical forms in which the principle of the invention may be used.

In said annexed drawing:—Figure 1 is a side elevation of the lower end of my improved fork; Fig. 2 is a plan view of the same; and Fig. 3 is a section on the line 3—3 in Fig. 2.

In Fig. 1 there is shown a handle 1, preferably formed of wood, which may be attached to a neck or shank 2, of the fork proper. In case the handle is received within this portion of the fork, the latter being formed into a socket, it is termed a neck, and it is this form which is shown in the figures, but it will be understood that if desired, this portion of the fork may be formed with a straight bar adapted to enter a longitudinal aperture formed in the end of the handle, when such portion of the fork will be called a shank.

Integrally attached to the neck 2, is a head 3, extending transversely of the neck and provided at substantially its middle portion with a bend or partial curved portion 4. The tines 5 extend outwardly from the head portion 3, and are disposed in substantially parallel relation as usual.

The neck 2 is curved adjacent to its outer end at 6, thus placing the loop 4 of the head 3, in a plane, spaced from the plane of the handle. The loop 4 in the head causes the remaining portion of the head 3 to be in still a different plane, still further spaced from the plane of the handle 1, and it is in this plane that the base portion of the tines of the fork lie. In this way it is possible to so dispose the tines with respect to the handle that the usual and desired amount of offset is secured, which renders the fork much more convenient in handling, and makes it possible to use shorter and straighter handles than has heretofore been the case. By this invention a certain proportion of the stock of handles may be utilized, which portion has heretofore either been wholly wasted or partially so by reason of being cut down to serve in other implements.

By forming a bend in the head 3 it becomes possible to elongate the neck 2 to compensate for the shorter handle without reducing the strength of the same by constructing it with the abrupt curve which would otherwise be necessary in order to properly position the tines. In this way I avoid the necessity of constructing the neck and fork proper of extra heavy stock which would make one end of the implement inconveniently heavy, although strength and safety are in no way sacrificed in obtaining this result.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention.

1. A fork having a curved neck, a head having a bend formed centrally therein, said head being attached at the center of such bend to said neck and extending transversely with respect to said neck, the portion of said head lying on either side of said neck being offset from, and lying in a different plane with respect to, said neck, and tines attached to said head and extending outwardly therefrom.

2. A fork having a curved neck formed into a socket adapted to receive a straight handle, a head having a bend formed centrally therein, said head being attached at the center of such bend to said neck and extending transversely with respect to said neck, the portion of said head lying on either side of said neck being offset from, and lying in a different plane with respect to, said neck, and tines attached integrally to said head and extending outwardly therefrom, the curve in said neck and the offset in said head due to the bend therein positioning said tines in proper relation to said handle.

Signed by me this 4th day of June, 1914.

WARREN H. COWDERY.

Attested by—
  E. D. LOWELL,
  OLIVER ESSELBURN.

---

Copies of this patent may be obtained for five cents each, by addressing the "Commissioner of Patents, Washington, D. C."